United States Patent
Pan et al.

(10) Patent No.: US 8,391,190 B2
(45) Date of Patent: Mar. 5, 2013

(54) METHOD AND DEVICE FOR CONFIGURING UPLINK SOUNDING REFERENCE SIGNAL

(75) Inventors: Xueming Pan, Beijing (CN); Shiqiang Suo, Beijing (CN); Yu Ding, Beijing (CN); Guojun Xiao, Beijing (CN)

(73) Assignee: China Academy of Telecommunications Equipment Co., Ltd., Beijing (CN)

( * ) Notice: Subject to any disclaimer, the term of this patent is extended or adjusted under 35 U.S.C. 154(b) by 281 days.

(21) Appl. No.: 12/990,372

(22) PCT Filed: Apr. 29, 2009

(86) PCT No.: PCT/CN2009/071565
§ 371 (c)(1),
(2), (4) Date: Oct. 29, 2010

(87) PCT Pub. No.: WO2009/132591
PCT Pub. Date: Nov. 5, 2009

(65) Prior Publication Data
US 2011/0058505 A1    Mar. 10, 2011

(30) Foreign Application Priority Data
Apr. 29, 2008 (CN) .......................... 2008 1 0105434

(51) Int. Cl.
H04J 3/06 (2006.01)
(52) U.S. Cl. ........................................ 370/280; 370/328
(58) Field of Classification Search .................. None
See application file for complete search history.

(56) References Cited

U.S. PATENT DOCUMENTS

| | | | | |
|---|---|---|---|---|
| 8,249,004 | B2 * | 8/2012 | Wang et al. | 370/329 |
| 2008/0039098 | A1 | 2/2008 | Papasakellariou et al. | |
| 2008/0043708 | A1 | 2/2008 | Muharemovic et al. | |
| 2008/0045260 | A1 | 2/2008 | Muharemovic et al. | |
| 2009/0073955 | A1 * | 3/2009 | Malladi | 370/349 |
| 2009/0109908 | A1 * | 4/2009 | Bertrand et al. | 370/329 |
| 2009/0129259 | A1 * | 5/2009 | Malladi et al. | 370/210 |
| 2009/0274076 | A1 * | 11/2009 | Muharemovic et al. | 370/280 |
| 2009/0279459 | A1 * | 11/2009 | Muharemovic et al. | 370/280 |
| 2010/0069028 | A1 * | 3/2010 | Choi et al. | 455/136 |
| 2010/0296591 | A1 * | 11/2010 | Xu et al. | 375/259 |
| 2012/0044848 | A1 * | 2/2012 | Womack et al. | 370/311 |
| 2012/0170485 | A1 * | 7/2012 | Maeda et al. | 370/252 |

FOREIGN PATENT DOCUMENTS
CN 101404817 A 4/2009

OTHER PUBLICATIONS
International Search Report for PCT/CN2009/071565 (in English) dated May 29, 2009; ISA/CN.

(Continued)

*Primary Examiner* — Min Jung

(57) ABSTRACT

The present invention provides a method for configuring a Sounding Reference Signal (SRS). The method includes: determining, by a base station, an SRS periodicity available for a cell, and determining at least one SRS configuration position available in a sub-frame for the cell based on the SRS periodicity determined; and jointly coding, by the base station, the SRS periodicity and the at least one SRS configuration position, and transmitting a result of the joint coding to all User Equipments (UE) in the cell through broadcast signaling. The present invention also provides an apparatus for configuring an SRS. The present invention implements configuration of SRS transmission and can avoid conflict between SRS and uplink control information.

13 Claims, 4 Drawing Sheets

OTHER PUBLICATIONS

English Translation of International Preliminary Report on Patentability (Chapter I) for PCT/CN2009/071565, issued Nov. 30, 2010.
CATT, RITT, R1-081777 3GPP TSG RAN WGI meeting #53 SRS configurations for TDD; May 9, 2008 section 1-section 3.
3GPP, 3GPP TS 36.211 V8.2.0 3rd Generation Partnership Project; Technical Specification Group Radio Access Network; Evolved Universal Terrestrial Radio Access (E-UTRA); Physical Channels and Modulation (Release 8) Mar. 2008 section 5-section 7.
Samsung; "SRS indication for TDD"; 3GPP Contribution R1-081211; TSG-RAN WG1 #52bis; Shenzhen, China; Mar. 31-Apr. 4, 2008; 4 pages.
Texas Instruments; "Views on SRS Parameters"; 3GPP Draft; R1-081366-SRSCONFIG, 3rd Generation Partnership Project (3GPP); Mobile Competence Centre; 650, Route Des Lucioles; F-06921 Sophia-Antipolis Cedes; France; vol. RAN WG1, #52bis; Shenzhen China; 20080327; Mar. 27, 2008; XP050109789; 4 pages.
Samsung; "Summary of Reflector Discussions on EUTRA UL RS"; 3GPP R1-081209; 3GPP TSG RAN WG1 #52bis; Shenzhen, China; Mar. 31-Apr. 4, 2008; 4 pages.
Motorola; "Open Issues on UL Sounding RS"; 3GPP Draft; R1-081279_UL_Sounding_RS; 3rd Generation Partnership Project (3GPP); Mobile Competence Centre; 650, Route Des Lucioles; F-06921 Sophia-Antipolis Cedes; France; vol. RAN WG1, No. Shenzhen, China; 20080327, Mar. 27, 2008; XP050109717; 6 pages.
Samsung; "Summary of Offline Discussions on EUTRA UL RS"; 3GPP Draft; R1-081662; 3rd Generation Partnership Project (3GPP); Mobile Competence Centre; 650, Route Des Lucioles; F-06921 Sophia-Antipolis Cedes; France; Apr. 9, 2008; XP002680866; 4 pages.
Ericsson; "Physical-layer parameters to be configured by RRC"; 3GPP Draft; R1-081645 {L1 Parameters after RAN1 52B}; 3rd Generation Partnership Project (3GPP); Mobile Competence Centre; 650, Route Des Lucioles; F-06921 Sophia-Antipolis Cedex, France; vol. RAN WG1; No. Shenzhen, China; 20080404, Apr. 9, 2008; XP050488802; 8 pages.
Extended European Search Report for European Patent Application No. 09737701.4, dated Aug. 9, 2012.
Japanese Notice of Reasons for Rejection for Japanese Patent Application No. 2011-506561, dated Jul. 31, 2012, and English translation thereof.
Korean Office Action for Korean Patent Application No. 10-2010-7026774, dated Mar. 9, 2012, and English translation thereof.
Korean Office Action for Korean Patent Application No. 10-2010-7026774, dated Jul. 24, 2012, and English translation thereof.
Korean Office Action for Korean Patent Application No. 10-2010-7026774, dated Oct. 22, 2012, and English translation thereof.

* cited by examiner

METHOD AND DEVICE FOR CONFIGURING UPLINK SOUNDING REFERENCE SIGNAL

FIELD OF THE INVENTION

The present invention relates to wireless communications, and more particularly, to a method and apparatus for configuring an uplink sounding reference signal.

BACKGROUND OF THE INVENTION

An uplink sounding reference signal (SRS) is an uplink signal transmitted by a user equipment (UE) to a base station. The base station measures quality of the uplink channel based on the SRS received.

Currently configuration of SRS transmission may be: for a frequency division duplex (FDD) system and a time division duplex (TDD) system, eight types of transmission periodicities, including 2 ms, 5 ms, 10 ms, 20 ms, 40 ms, 80 ms, 160 ms and 320 ms are supported by UEs. For the TDD system, an SRS may be transmitted in an uplink pilot time slot (UpPTS). When the UpPTS includes only one single carrier-frequency division multiple access (SC-FDMA) symbol, the SC-FDMA symbol can be used for SRS transmission. If the UpPTS includes two SC-FDMA symbols, both SC-FDMA symbols may be configured by the base station for SRS transmission. In the UpPTS, the SRS can be transmitted over the whole uplink bandwidth. Because neither of uplink data and control signaling is transmitted in the UpPTS, SRS transmitted in the UpPTS would not conflict with physical uplink shared channel (PUSCH), physical uplink control channel (PUCCH), etc. If the SRS is configured in a regular uplink sub-frame, the SRS is transmitted at the last symbol of the uplink sub-frame. When PUSCH is transmitted in the uplink sub-frame, all UEs should remove the last symbol of the uplink sub-frame.

When an SRS is transmitted in a regular uplink sub-frame, the SRS would conflict with uplink control information. Specifically, in the regular uplink sub-frame, the SRS should not be transmitted in the frequency band of the PUCCH. If a UE needs to transmit an Acknowledgement/Negative Acknowledgement (ACK/NACK) and an SRS simultaneously in the same uplink sub-frame, a shortened format of the ACK/NACK is transmitted or the SRS will not be transmitted. If the UE needs to transmit a Channel Quality Indicator (CQI) and an SRS simultaneously in the same uplink sub-frame, the SRS will not be transmitted. If the UE needs to transmit a scheduling request (SR) and an SRS simultaneously in the same uplink sub-frame, the SRS will not be transmitted.

As can be seen, the prior art does not provide a specific solution for configuring SRS transmission in a system. As a result, SRS can not be transmitted normally.

SUMMARY OF THE INVENTION

In view of the above, embodiments of the present invention provide a method and apparatus for configuring an uplink SRS, so as to provide a detailed solution for configuring SRS transmission.

Embodiments of the present invention provide a method for configuring an SRS, including:

determining, by a base station, an SRS periodicity available for a cell, and determining at least one SRS configuration position available for the cell based on the SRS periodicity determined; and jointly coding, by the base station, the SRS periodicity and the at least one SRS configuration position, and transmitting a result of the joint coding to all User Equipments (UE) in the cell through broadcast signaling.

Embodiments of the present invention provide a method for configuring an SRS, including:

determining, by a base station, an SRS periodicity and at least one SRS transmission position for a UE, and transmitting an indication indicating a result of jointly coding the SRS periodicity and the at least one SRS transmission position to the UE through UE-specific signaling.

Embodiments of the present invention provide an apparatus for configuring an SRS, including:

a cell-specific SRS periodicity configuring module, adapted to determine an SRS periodicity available for a cell;

a cell-specific SRS position configuring module, adapted to determine at least one SRS position in a sub-frame available for the cell based on the SRS periodicity determined by the cell-specific SRS periodicity configuring module;

a joint coding module, adapted to jointly code the SRS periodicity determined by the cell-specific SRS periodicity configuring module and the at least one SRS position determined by the cell-specific SRS position configuring module; and a broadcast signaling transmitting module, adapted to transmit a result of joint coding obtained by the joint coding module via broadcast signaling.

Embodiments of the present invention provide an apparatus for configuring an SRS, including:

a User Equipment (UE)-specific SRS periodicity configuring module, adapted to determine a periodicity for SRS transmission of a UE in a cell;

a UE-specific SRS position configuring module, adapted to determine at least one position for SRS transmission of the UE based on the periodicity determined by the UE-specific SRS periodicity configuring module;

a joint coding module, adapted to jointly code the periodicity determined by the UE-specific SRS periodicity configuring module and the at least one position determined by the UE-specific SRS position configuring module;

a UE-specific signaling transmitting module, adapted to transmit a result of the joint coding from the joint coding module to the UE through UE-specific signaling.

Embodiments of the present invention provide an apparatus for configuring an SRS, including:

an SRS periodicity configuring module, adapted to determine an SRS periodicity available for a cell and a periodicity of SRS transmission for a UE in the cell;

an SRS position configuring module, adapted to determine at least one SRS configuration position available for the cell based on the SRS periodicity determined by the SRS periodicity configuring module for the cell; and determine at least one position for the UE to transmit SRS based on the periodicity determined by the SRS periodicity configuring module for the UE;

a joint coding module, adapted to jointly code the SRS periodicity determined by the SRS periodicity configuring module for the cell and the at least one SRS configuration position determined by the SRS position configuring module for the cell; and jointly code the periodicity determined by the SRS periodicity configuring module for the UE and the at least one position determined by the SRS position configuring module for the UE to transmit the SRS;

a signaling transmitting module, adapted to transmit a result of jointly coding the SRS periodicity for the cell and the at least one SRS configuration position for the cell from the joint coding module through broadcast signaling; and transmit a result of jointly coding the periodicity for the UE and the at least one position for the UE from the joint coding module to the UE through UE-specific signaling.

As can be seen from the above, the base station determines for a cell an SRS periodicity and at least one SRS configuration position in a sub-frame, and transmits the SRS periodicity and the at least one SRS configuration position for the cell which are jointly coded to all UEs in the cell. Alternatively, the base station determines for a UE in the cell an SRS periodicity and at least one SRS configuration position in a sub-frame, and transmits the SRS periodicity and the at least one SRS configuration position which are jointly coded to the UE through UE-specific signaling. Thereby, configuration of SRS transmission can be implemented and conflict between SRS and uplink control information can be avoided.

DETAILED DESCRIPTION OF THE INVENTION

Figure 1:
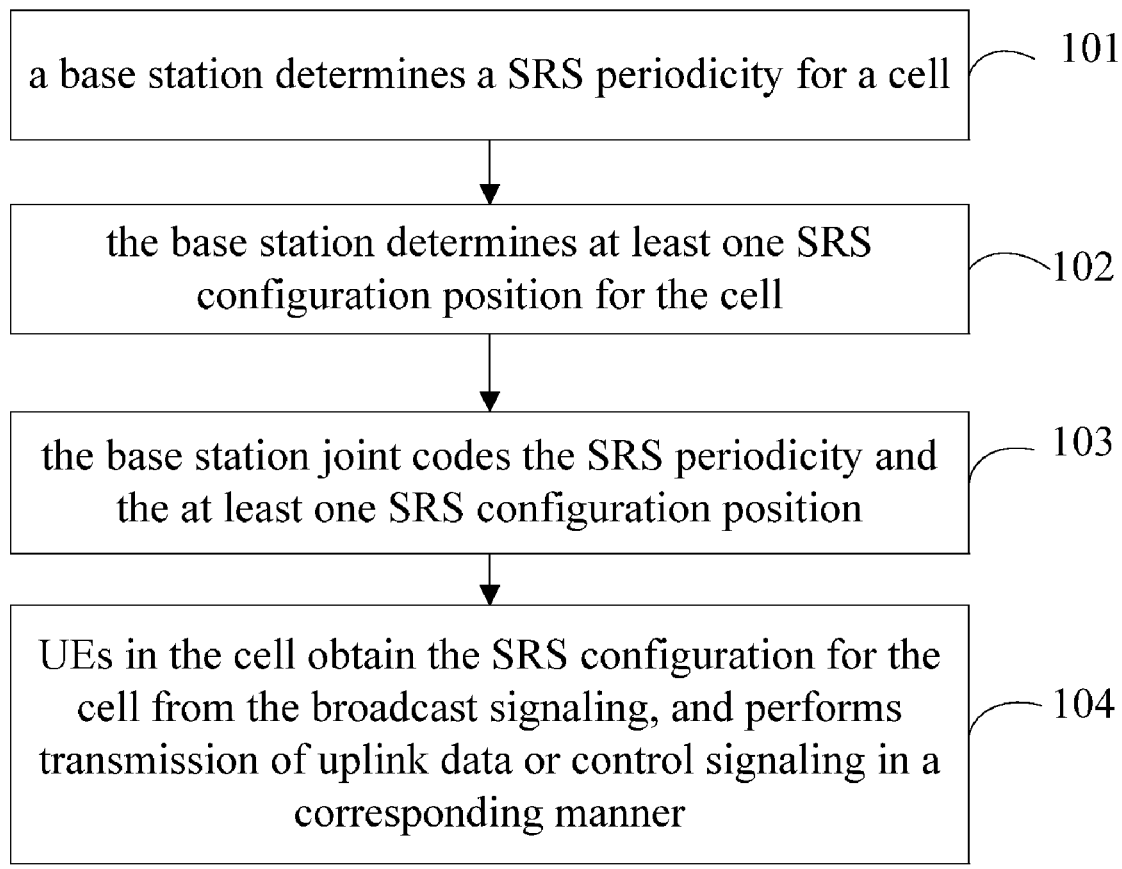
FIG. 1 is a flowchart illustrating a configuration process through broadcast signaling in accordance with Embodiment one of the present invention.

The present invention provides a technical scheme for configuring SRS transmission in time domain, and particularly includes two aspects: a configuration process through broadcast signaling and a configuration process through UE-specific signaling. The technical scheme of the present invention can be applied to both FDD and TDD systems.

To make the objective, technical scheme and merits of the present invention clearer, the present invention will be described hereinafter in detail with reference to accompanying drawings and embodiments.

Embodiment one provides a configuration scheme via broadcast signaling. As mentioned above, for FDD and TDD systems, there may be conflict between SRS and PUSCH or PUCCH when the SRS is to be transmitted in a regular uplink sub-frame. Therefore, all UEs in a cell need to know which uplink sub-frames in the cell are configured for SRS transmission, so that when the PUSCH and PUCCH are to be transmitted in these subframes and may conflict with the SRS transmission, the UEs are able to adopt necessary measures to avoid the conflict. The necessary measures may include removing a symbol, or adopting a shortened PUCCH format, or giving up the SRS transmission, etc. The broadcast signaling is used by the base station for informing the UEs of which regular uplink sub-frames are configured for SRS transmission.

In order to support different SRS periodicities (including 2 ms, 5 ms, 10 ms, 20 ms, 40 ms, 80 ms, 160 ms and 320 ms) supported by UEs with flexibility, the base station may configure at least one SRS sub-frame position accordingly. The SRS periodicity may be configured to be a common divisor, usually the maximum common divisor, of the SRS periodicities supported by all UEs in the cell. For example, if an operator takes a UE in the cell supporting a SRS periodicity of 2 ms into consideration, the SRS sub-frame configuration of the base station should enable at least one SRS transmission position every 2 ms. For another example, if some UEs in the cell supports a SRS periodicity of 2 ms while some other UEs in the cell supports a SRS periodicity of 5 ms, SRS periodicity of the cell should be configured to be 1 ms to support the UEs simultaneously. The SRS periodicity of the cell may vary with requirements of UEs in the cell for SRS periodicity, and may be re-configured according to the above-mentioned principles.

In addition, in order to reduce inter-cell interference caused by SRS transmission, SRS symbols of adjacent cells should be configured in different uplink sub-frames. That is, the uplink sub-frames carrying SRSs of adjacent cells should not overlap with each other in time domain.

The broadcast signaling is used for indicating a possible periodicity of an SRS symbol and at least one sub-frame where the SRS symbol is possibly located. When flexibility is required, the following factors should be considered.

When periodicity and position of an SRS symbol are indicated via respective parameters, supposing the number of SRS transmission periodicities supported by UEs is N (the periodicities being $X_1, X_2, \ldots X_N$ respectively), M bits are used for indicating the N periodicities configured for the SRS symbol, and $M = \lceil \log_2 N \rceil$, where $\lceil \ \rceil$ represents rounding a value upwards. L bits are used for indicating all possible SRS symbol positions when the periodicity is $X_N$, and $L = \lceil \log_2 X_N \rceil$. Thereby, a broadcast signaling of M+L bits is needed.

For example, if N equals 8 and the 8 periodicities are 2 ms, 5 ms, 10 ms, 20 ms, 40 ms, 80 ms, 160 ms and 320 ms respectively, it can be obtained that M=3 and L=9 according to the above formulae. Parameters indicating the SRS periodicity and SRS symbol positions are jointly coded.

When the SRS periodicity and SRS symbol positions are jointly coded and indicated in a combined manner, supposing the number of SRS transmission periodicities supported by UEs is N (the N periodicities are $X_1, X_2, \ldots X_N$ respectively), a broadcast signaling of $K = \lceil \log_2 (X_1 + X_2 + \ldots + X_N) \rceil$ bits is needed in total for combined indication.

For example, if N equals 8 and the 8 periodicities are 2 ms, 5 ms, 10 ms, 20 ms, 40 ms, 80 ms, 160 ms and 320 ms respectively, it can be obtained that K=10.

Since a cell has relatively limited broadcast channel resources, it is necessary to consider reducing broadcast signaling overhead. Configuration items for the two aspects of SRS periodicity and the SRS symbol position may be respectively simplified based on the following principles:

a) different SRS periodicities of UEs in a cell should be supported with flexibility;

b) SRS symbols in different cells should not overlap in time domain to reduce inter-cell interference; and c) UpPTS resources should be fully used for SRS transmission to improve system performance since SRS transmitted in UpPTS will not conflict with PUSCH or PUCCH in the TDD system.

Embodiment one of the present invention adopts the following technical measures to reduce broadcast signaling overhead:

(1) setting an upper limit for the maximum SRS periodicity configured by the base station, for example 40 ms, and supporting seven different periodicities including no SRS, 1 ms, 2 ms, 5 ms, 10 ms, 20 ms, 40 ms to improve the flexibility of SRS configuration;

(2) limiting the flexibility of candidate SRS symbol positions within one periodicity in one cell, e.g. restricting the maximum number of candidate SRS symbol positions to 7, i.e., seven adjacent cells may transmit respective SRS at different symbol positions.

(3) jointly coding the two pieces of information, i.e., SRS periodicity and SRS symbol position of the cell to further reduce signaling overhead, that is, a signaling indication includes both pieces of information.

According to the above design principles, embodiments for the FDD system and the TDD system will be hereinafter described respectively.

Solution one adopts a broadcast signaling of 5 bits as the indication, i.e. restricting the maximum number of SRS configuration manners to 32. The broadcast signaling for an FDD system is shown in Table 1, the broadcast signaling for a TDD system is shown in Table 2, and at most seven adjacent cells are allowed to have different SRS symbol positions from each other.

Finer SRS configuration density levels (items 29 and 30 in Table 1 and items 28, 29 and 30 in Table 2) can be supported.

Description of Table 1 and Table 2:

The column of "SRS Periodicity" represents the SRS periodicity configured for a cell, and is in unit of millisecond (ms). The column of "SRS Sub-frame Offset" represents a radio Sub-frame Number (SFN) and the position of a sub-frame in which SRS can be transmitted in the current cell. The column of "Configuration Detail" represents SRS symbol position in a sub-frame of a radio frame, where "1" indicates the symbol can be used for transmitting SRS and "0" indicates the symbol can not be used for transmitting SRS. "0 (SFN % 2=0)" indicates that the sub-frame number configured for transmitting SRS is 0 when the "SFN mod 2" is 0. "8 SRS/10 ms" indicates 8 SRSs are configured within a periodicity of 10 ms.

TABLE 1

| Configuration No. | SRS Periodicity (ms) | SRS Sub-frame Offset | Configuration Detail |
|---|---|---|---|
| 0 | 1 | Every one | 1111111111 |
| 1 | 2 | 0 | 1010101010 |
| 2 | 2 | 1 | 0101010101 |
| 3 | 5 | 0 | 1000010000 |
| 4 | 5 | 1 | 0100001000 |
| 5 | 5 | 2 | 0010000100 |
| 6 | 5 | 3 | 0001000010 |
| 7 | 5 | 4 | 0000100001 |
| 8 | 10 | 0 | 1000000000 |
| 9 | 10 | 1 | 0100000000 |
| 10 | 10 | 2 | 0010000000 |
| 11 | 10 | 3 | 0001000000 |
| 12 | 10 | 4 | 0000100000 |
| 13 | 10 | 5 | 0000010000 |
| 14 | 10 | 6 | 0000001000 |
| 15 | 20 | 0 (SFN % 2 = 0) | 1000000000 |
| 16 | 20 | 1 (SFN % 2 = 0) | 0100000000 |
| 17 | 20 | 2 (SFN % 2 = 0) | 0010000000 |
| 18 | 20 | 3 (SFN % 2 = 0) | 0001000000 |
| 19 | 20 | 4 (SFN % 2 = 0) | 0000100000 |
| 20 | 20 | 5 (SFN % 2 = 0) | 0000010000 |
| 21 | 20 | 6 (SFN % 2 = 0) | 0000001000 |
| 22 | 40 | 0 (SFN % 4 = 0) | 1000000000 |
| 23 | 40 | 1 (SFN % 4 = 0) | 0100000000 |
| 24 | 40 | 2 (SFN % 4 = 0) | 0010000000 |
| 25 | 40 | 3 (SFN % 4 = 0) | 0001000000 |
| 26 | 40 | 4 (SFN % 4 = 0) | 0000100000 |
| 27 | 40 | 5 (SFN % 4 = 0) | 0000010000 |
| 28 | 40 | 6 (SFN % 4 = 0) | 0000001000 |
| 29 | N/A | 8 SRS/10 ms | 1111111010 |
| 30 | N/A | 6 SRS/10 ms | 1110011100 |
| 31 | Inf. | N/A | 0000000000 |

TABLE 2

| Configuration No. | SRS Periodicity | SRS Sub-frame Position | Configuration Detail |
|---|---|---|---|
| 0 | 1 | Each uplink frame + UpPTS | 0111101111 |
| 1 | 2 | UpPTS + 2 | 0110001100 |
| 2 | 2 | UpPTS + 3 | 0101001010 |
| 3 | 5 | UpPTS | 0100001000 |
| 4 | 5 | 2 | 0010000100 |
| 5 | 5 | 3 | 0001000010 |
| 6 | 5 | 4 | 0000100001 |
| 7 | 10 | UpPTS(#1) | 0100000000 |
| 8 | 10 | 2 | 0010000000 |
| 9 | 10 | 3 | 0001000000 |
| 10 | 10 | 4 | 0000100000 |
| 11 | 10 | UpPTS(#6) | 0000001000 |
| 12 | 10 | 7 | 0000000100 |
| 13 | 10 | 8 | 0000000010 |
| 14 | 20 | UpPTS#1 (in SFN % 2 = 0) | 0100000000 |
| 15 | 20 | UpPTS#1 (in SFN % 2 = 1) | 0100000000 |
| 16 | 20 | UpPTS#6 (in SFN % 2 = 0) | 0000001000 |
| 17 | 20 | UpPTS#6 (in SFN % 2 = 1) | 0000001000 |
| 18 | 20 | 2 (in SFN % 2 = 0) | 0010000000 |
| 19 | 20 | 2 (in SFN % 2 = 1) | 0010000000 |
| 20 | 20 | 3 (in SFN % 2 = 0) | 0001000000 |
| 21 | 40 | UpPTS(in SFN % 4 = 0) | 0100000000 |
| 22 | 40 | UpPTS(in SFN % 4 = 1) | 0100000000 |
| 23 | 40 | UpPTS(in SFN % 4 = 2) | 0100000000 |
| 24 | 40 | UpPTS(in SFN % 4 = 3) | 0100000000 |
| 25 | 40 | 2 (in SFN % 2 = 0) | 0010000000 |
| 26 | 40 | 2 (in SFN % 2 = 1) | 0010000000 |
| 27 | 40 | 2 (in SFN % 2 = 2) | 0010000000 |
| 28 | N/A | 8 SRS/10 ms | 0111001110 |
| 29 | N/A | 7 SRS/10 ms | 0111001110 |
| 30 | N/A | 5 SRS/10 ms | 0110001000 |
| 31 | Inf. | N/A | 0000000000 |

Solution two restricts the maximum number of SRS configuration manners to 16 to further reduce broadcast signaling overhead. A broadcast signaling of 4 bits is adopted, Table 3 is for an FDD system and Table 4 is for a TDD system. At most 3 adjacent cells are enabled to transmit SRS at different SRS symbol positions from each other.

TABLE 3

| Configuration No. | SRS Periodicity (ms) | SRS Sub-frame Position | Configuration Detail |
|---|---|---|---|
| 0 | 1 | everyone | 1111111111 |
| 1 | 2 | 0 | 1010101010 |
| 2 | 2 | 1 | 0101010101 |
| 3 | 5 | 0 | 1000010000 |
| 4 | 5 | 1 | 0100001000 |
| 5 | 5 | 2 | 0010000100 |
| 6 | 10 | 0 (1$^{st}$ half-frame) | 1000000000 |
| 7 | 10 | 1 (1$^{st}$ half-frame) | 0100000000 |
| 8 | 10 | 2 (1$^{st}$ half-frame) | 0010000000 |
| 9 | 20 | 0 (SFN % 2 = 0) | 1000000000 |
| 10 | 20 | 1 (SFN % 2 = 0) | 0100000000 |
| 11 | 20 | 2 (SFN % 2 = 0) | 0010000000 |
| 12 | 40 | 0 (SFN % 4 = 0) | 1000000000 |
| 13 | 40 | 1 (SFN % 4 = 0) | 0100000000 |
| 14 | 40 | 2 (SFN % 4 = 0) | 0010000000 |
| 15 | Inf. | N/A | 0000000000 |

TABLE 4

| Configuration No. | SRS Periodicity (ms) | SRS Sub-frame Offset | Configuration Detail |
|---|---|---|---|
| 0 | 1 | Each uplink sub-frame + UpPTS | 0111101111 |

TABLE 4-continued

| Configuration No. | SRS Periodicity (ms) | SRS Sub-frame Offset | Configuration Detail |
|---|---|---|---|
| 1 | 2 | UpPTS + 2 | 0110001100 |
| 2 | 2 | UpPTS + 3 | 0101001010 |
| 3 | 5 | UpPTS | 0100001000 |
| 4 | 5 | 2 | 0010000100 |
| 5 | 5 | 3 | 0001000010 |
| 6 | 10 | UpPTS(#1) | 0100000000 |
| 7 | 10 | UpPTS(#6) | 0000001000 |
| 8 | 10 | 2 | 0010000000 |
| 9 | 20 | UpPTS(in SFN % 2 = 0) | 0100000000 |
| 10 | 20 | UpPTS(in SFN % 2 = 1) | 0100000000 |
| 11 | 20 | 2 (in SFN % 2 = 0) | 0010000000 |
| 12 | 40 | UpPTS(in SFN % 4 = 0) | 0100000000 |
| 13 | 40 | UpPTS(in SFN % 4 = 1) | 0100000000 |
| 14 | 40 | UpPTS(in SFN % 4 = 2) | 0100000000 |
| 15 | Inf. | N/A | 0000000000 |

Embodiment one of the present invention takes the configuration process via broadcast signaling in a TDD system as an example. As shown in FIG. 1, the process may include steps as follows.

In step 101, a base station determines at least one available SRS periodicity for a local cell. This step may be performed when the network is deployed. Specifically, the base station determines requirements for SRS required by operations including uplink scheduling, downlink scheduling, and downlink beam-forming, etc. based on characteristics such as a service model of the local cell. According to the requirements, the base station makes SRS configurations based on requirements of at least one UE requiring the most SRS in the cell with other UEs' SRS requirements also taken into consideration. For example, if the cell needs to support UEs with the minimum SRS periodicity of 10 ms, the SRS periodicity of the cell is configured to be 10 ms. For another example, if the cell needs to support UEs requiring an SRS periodicity of 2 ms and UEs requiring an SRS periodicity of 5 ms, the SRS periodicity of the cell is configured to be 1 ms so that the cell can support both types of UEs at the same time. The SRS periodicity of the cell may change with SRS periodicity requirements of UEs in the cell, and may be re-configured based on the above-mentioned principles.

In step 102, the base station determines at least one available SRS sub-frame position for the cell. For the TDD system, on the premise of requirements of SRS periodicities are met, the base station preferentially configures the SRS transmission in an UpPTS. Based on each SRS periodicity of the cell, the base station further determines at least one SRS sub-frame position for the local cell, e.g., different SRS sub-frame positions are respectively configured for different cells. An SRS configuration table as shown in Table 2 or Table 4 is pre-configured in the base station. The SRS position configuration may include information about whether an uplink sub-frame includes an SRS without specifying the number of SRS symbols in the UpPTS.

For example, if the SRS periodicity is configured to be 5 ms in step 101, different configurations may be selected from the three candidate configuration manners corresponding to the periodicity of 5 ms in Table 4 for adjacent cells. For example, the base station performs a "mod 3" operation on the cell number of the base station to determine the configuration manner to be adopted. Alternatively, the SRS configuration table shown in Table 2 may be used, and there are four candidate configuration manners corresponding to the periodicity of 5 ms. Generally, adjacent cells have consecutive cell numbers and therefore SRS sub-frame positions configured for the adjacent cells will not overlap with each other, which can reduce inter-cell interference.

In step 103, the base station jointly codes the SRS periodicity and the at least one SRS sub-frame position, transmits an indication obtained by the joint coding to all UEs in the cell through broadcast signaling (SIB). Specifically, the base station searches in Table 4 for at least one configuration number corresponding to the SRS periodicity and the at least one SRS sub-frame position determined, using a code of 4 bits for denoting the at least one configuration number and loads the code into the broadcast signaling. If the configuration table shown in Table 2 is adopted, a code of 5 bits may be used for denoting the configuration number.

In step 104, a UE in the cell obtains SRS configuration of the cell from the broadcast signaling, and performs uplink transmission of data or control signals according to the SRS configuration obtained, e.g., removing a symbol or adopt a shortened format for the transmission. Therefore, conflict between SRS and uplink data or control signals can be avoided.

Embodiment two of the present invention provides a scheme utilizing UE-specific signaling.

As mentioned in Embodiment one, the broadcast signaling is used for transmitting SRS symbol configuration in time domain to all UEs in a cell. For a specific UE, SRS periodicity and at least one SRS symbol position for SRS transmission need to be scheduled and determined by the base station, and the scheduling policy is transmitted by the base station to the UEs via UE-specific signaling.

Embodiment two of the present invention takes the following principles into consideration in designing the UE-specific signaling:

a) different SRS periodicities should be supported with flexibility;

b) SRS transmission corresponding to each SRS periodicity of a UE can be configured in any of all SRS symbol positions broadcasted in the cell;

c) UE-specific SRS periodicity and SRS symbol position should be jointly coded to reduce signaling overhead.

Based on the above design principles, solutions for an FDD system and a TDD system will be hereinafter described respectively.

For the FDD system:

Since SRS periodicities supported by UEs include the following 8 types: 2 ms, 5 ms, 10 ms, 20 ms, 40 ms, 80 ms, 160 ms and 320 ms. To reduce signaling overhead, the 8 SRS periodicities and corresponding SRS symbol positions are jointly coded and then transmitted. Accordingly, there are a total of 2+5+10+20+40+80+160+320=637 states which can be indicated by 10 bits.

For example, 320 represents that a certain UE is configured with a periodicity of 320 ms, and the UE may transmit the SRS in any symbol position corresponding to the periodicity of 320 ms, i.e., there are 320 possible configuration manners. Situations for other periodicities are similar.

For the TDD system, the UE may adopt any of the following manners to obtain the maximum flexibility of SRS transmission in UpPTS:

transmitting SRS only at the first symbol in the UpPTS;
transmitting SRS only at the second symbol in the UpPTS;
transmitting SRS simultaneously at two symbols in the UpPTS (via the same transmitting antenna);
transmitting SRS simultaneously at two symbols in the UpPTS (via different transmitting antennae alternately).

Solution one uses another 2 bits in an explicit format for indicating 4 possible configuration manners available for a UE to transmit SRS in the UpPTS. The 2 bits are only applied to the situation where the UE transmits SRS in the UpPTS. There are a total of 2+4+8+16+32+64+128+256=510 states of the UE-specific SRS periodicity and SRS start position, and therefore, 2+9=11 bits of UE-specific signaling are required. Among the 11 bits, 9 bits are used for indicating a configuration manner and SRS periodicity for SRS transmission in a common uplink time slot (as shown in Table 1, available uplink sub-frames in the TDD system are less than those in the FDD system, and therefore the UE in the TDD system may have less choices of candidate symbol positions for SRS transmission under each type of periodicity than in the FDD system).

Solution two jointly codes the 4 configuration manners for SRS transmission in the UpPTS, SRS periodicity and SRS start position, and there are a total of 8+7+14+28+56+112+224+448=897 states which can be indicated by 10 bits.

Figure 2:
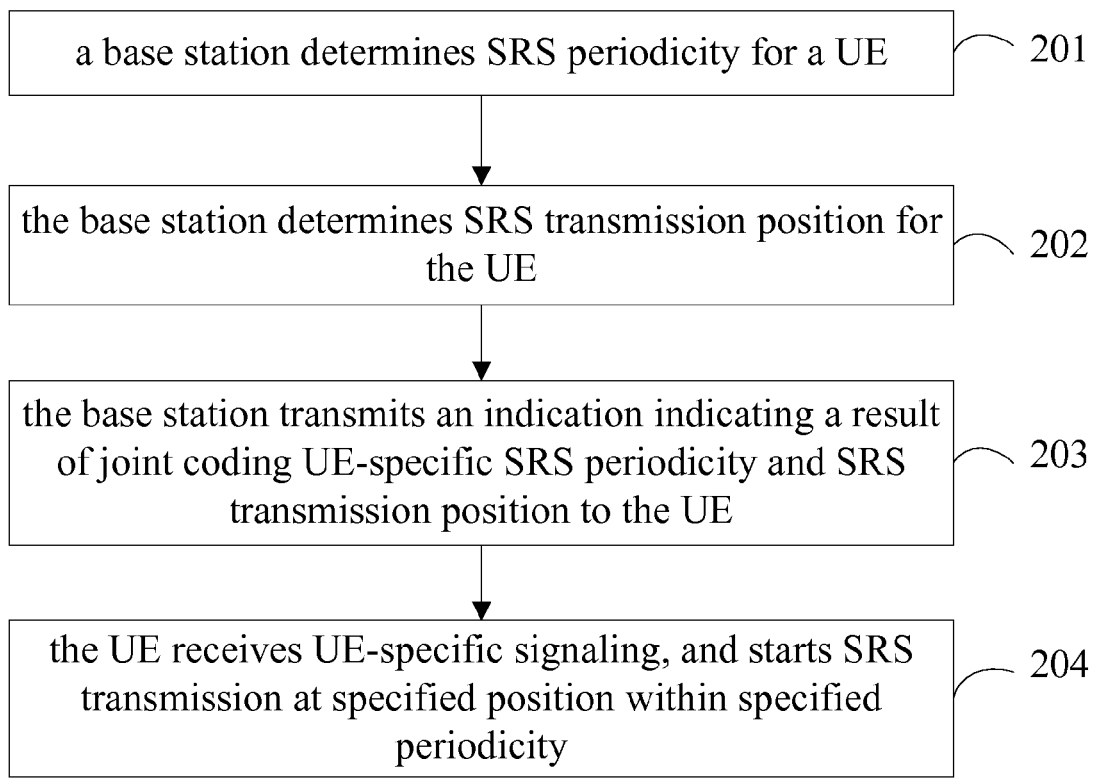
FIG. 2 is a flowchart illustrating a configuration process through UE-specific signaling in accordance with Embodiment two of the present invention.

FIG. 2 is a flowchart illustrating a configuration process through UE-specific signaling in accordance with Embodiment two of the present invention. As shown in FIG. 2, the process may include steps as follows.

In step 201, a base station determines an SRS periodicity for a UE. The determining may be based on a service type, moving speed, and purpose of SRS (uplink scheduling, downlink scheduling, downlink beam-forming) and etc. of the UE. Shorter SRS periodicity generates higher the accuracy of scheduling.

In step 202, the base station determines at least one position at which the SRS is to be transmitted by the UE. The determining may be based on the accuracy of scheduling (the shorter the time interval between transmitting the SRS transmission and uplink data transmission and/or downlink data reception of the UE is, the higher the accuracy will be) and based on SRS multiplexing between UEs in the cell, and then selects a position for the UE from all possible positions within the SRS periodicity configured for the cell.

Particularly, for a UE transmitting SRS in an UpPTS, the base station may determine which symbol in the UpPTS will be used by the UE for SRS transmission, and set particular restrictions for particular UEs. For example, for a transmission power restricted UE, the base station may schedule the UE to use two consecutive symbols in the UpPTS for transmitting SRS. For a UE requiring fast SRS antenna switching, the base station may schedule the UE to use two symbols in the UpPTS for transmitting SRS via different transmitting antennae alternately.

In step 203, the base station transmits an indication to the UE, indicating jointly coded UE-specific SRS periodicity and SRS transmission position.

Particularly, for the TDD system, if the configuration manner of solution one is adopted, the base station may use the another 2 bits of explicit UE-specific signaling for indicating details of configuration of SRS transmission in the UpPTS of the UE. If the configuration manner of solution two is adopted, the base station may transmit an indication including jointly coded three pieces of information, i.e., details of configuration for SRS transmission in the UpPTS of the UE, UE-specific SRS periodicity and at least one SRS transmission position, to the UE.

In step 204, the UE receives the UE-specific signaling, and starts SRS transmission in the at least one position specified within the SRS periodicity specified. For the TDD system, if the UE needs to transmit SRS in the UpPTS, the UE determines the manner for transmitting the SRS in the UpPTS according to the UE-specific signaling or accordingly to signaling information which is jointly coded with other information.

In practice, the base station may first transmit available SRS periodicity and SRS transmission positions to all UEs in the cell through broadcast signaling, and then transmit UE-specific SRS periodicity and at least one SRS transmission position to a UE through UE-specific signaling. The UE may transmit SRS according to the UE-specific signaling.

Figure 3:
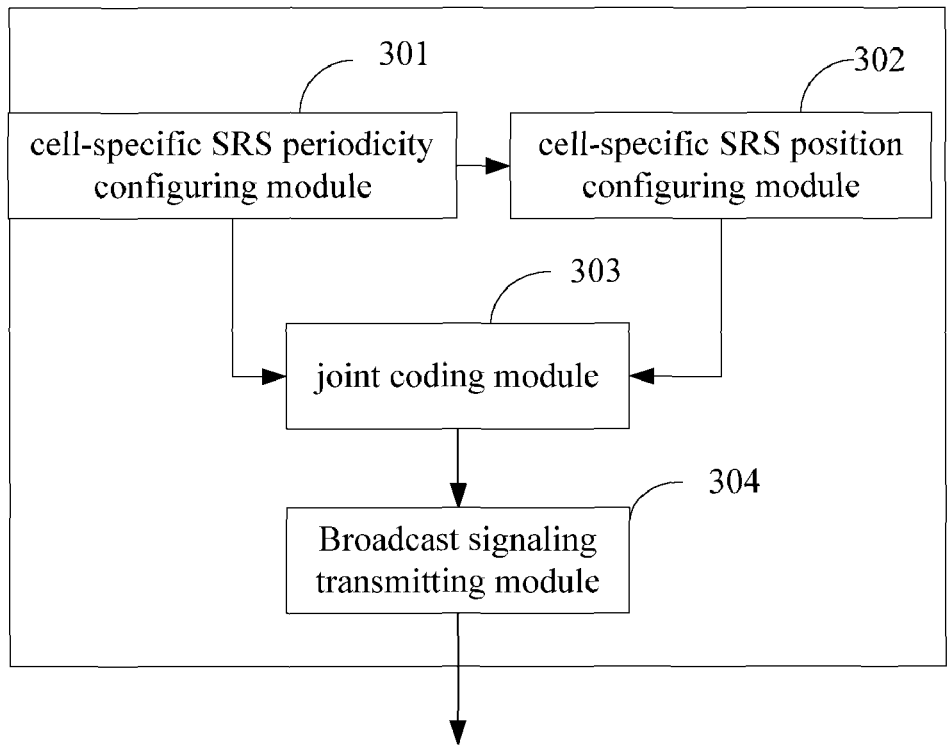
FIG. 3 is a schematic illustrating a structure of an apparatus for configuring an uplink sounding reference signal in accordance with Embodiment three of the present invention.

Embodiment three of the present invention provides an apparatus for configuring an uplink sounding reference signal. The apparatus is located in a base station. FIG. 3 illustrates a structure of the apparatus. As shown in FIG. 3, the apparatus may include:

a cell-specific SRS periodicity configuring module 301, adapted to determine an SRS periodicity available for a cell;

a cell-specific SRS position configuring module 302, adapted to determine at least one available SRS configuration position in a sub-frame in the cell based on the SRS periodicity determined by the cell-specific SRS periodicity configuring module 301;

a joint coding module 303, adapted to jointly code the SRS periodicity determined by the cell-specific SRS periodicity configuring module 301 and the at least one SRS configuration position determined by the cell-specific SRS position configuring module 302; and a broadcast signaling transmitting module 304, adapted to transmit a result of the joint coding from the joint coding module 303 through broadcast signaling.

Preferably, the joint coding module 303 may include:

a configuration table unit, adapted to store a relation table which associates a configuration number with an SRS periodicity and an SRS configuration position;

a searching unit, adapted to search in the relation table for a configuration number corresponding to the SRS periodicity and the SRS transmission position determined.

Figure 4:
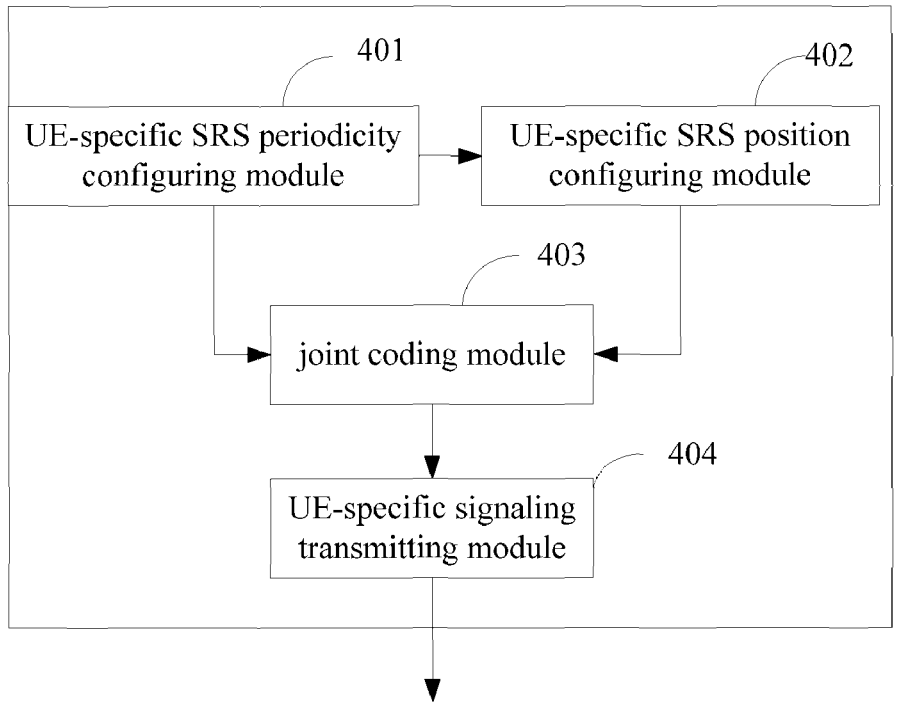
FIG. 4 is a schematic illustrating a structure of an apparatus for configuring an uplink sounding reference signal in accordance with Embodiment four of the present invention.

Embodiment four of the present invention provides an apparatus for configuring a sounding reference signal. The apparatus is located in a base station. FIG. 4 shows a structure of the apparatus. As shown in FIG. 4, the apparatus may include:

a UE-specific SRS periodicity configuring module 401, adapted to determine a periodicity for a UE in a cell for SRS transmission;

a UE-specific SRS position configuring module 402, adapted to determine at least one SRS transmission position for the UE to transmit the SRS based on the periodicity determined by the UE-specific SRS periodicity configuring module 401;

a joint coding module 403, adapted to jointly code the periodicity determined by the UE-specific SRS periodicity configuring module 401 and the at least one SRS transmission position determined by the UE-specific SRS position configuring module 402;

a UE-specific signaling transmitting module 404, adapted to transmit a result of the joint coding from the joint coding module 403 to the UE through UE-specific signaling.

If the apparatus is applied to the TDD system, the UE-specific SRS transmission position configuring module 402 may included:

a guarding period configuring unit, adapted to set a configuration manner for SRS transmission in an UpPTS.

Accordingly, the joint coding module 403 is adapted to jointly code the UE-specific SRS periodicity and the SRS transmission position, and adopt an explicit format for indicating a configuration manner for the UE to transmit SRS in the UpPTS; or the joint coding module 403 is adapted to jointly code the UE-specific SRS periodicity, the at least one SRS transmission position and the configuration manner for the UE to transmit the SRS in the UpPTS.

Figure 5:
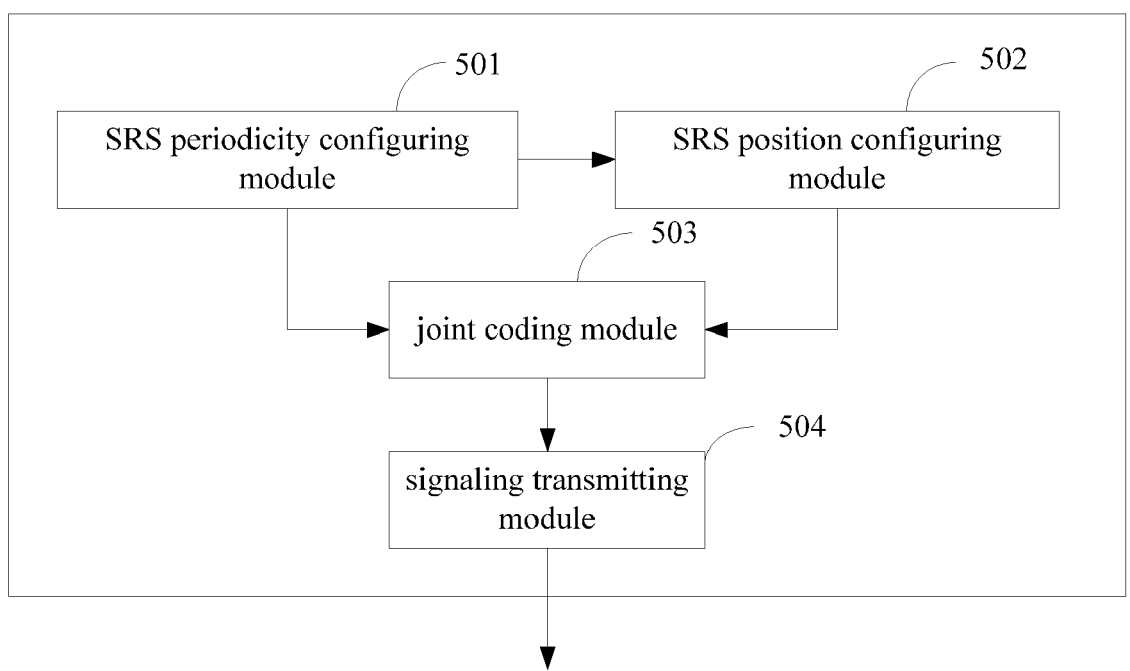
FIG. 5 is a schematic illustrating a structure of an apparatus for configuring an uplink sounding reference signal according to Embodiment five of the present invention.

Embodiment five of the present invention provides an apparatus for configuring a sounding reference signal. The apparatus is located in a base station. FIG. 5 shows a structure of the apparatus. The apparatus may include:

an SRS periodicity configuring module 501, adapted to determine an SRS periodicity available for a cell, and a periodicity for SRS transmission of a UE in the cell;

an SRS position configuring module 502, adapted to determine, based on the SRS periodicity determined by the SRS periodicity configuring module 501, at least one SRS configuration position in a sub-frame available for the cell; and determine, based on the periodicity determined by the SRS periodicity configuring module 501, at least one SRS transmission position for the UE to transmit the SRS;

a joint coding module 503, adapted to jointly code the SRS periodicity determined by the SRS periodicity configuring module 501 for the cell and the at least one SRS configuration position determined by the SRS position configuring module 502 for the cell; and jointly code the periodicity determined by the SRS periodicity configuring module 501 and the at least one SRS transmission position determined by the SRS position configuring module 502 for the UE to transmit the SRS;

a signaling transmitting module 504, adapted to transmit a result of jointly coding the SRS periodicity for the cell and the SRS configuration position for the cell from the joint coding module 503 through broadcast signaling; and transmit a result of joint coding the UE-specific periodicity and the UE-specific SRS transmission position from the joint coding module 503 to the UE through UE-specific signaling.

Embodiments of the present invention provide a method for configuring SRS transmission in an LTE system, and provide solutions for the FDD system and the TDD system respectively. According to the solutions in the above embodiments, the FDD system and the TDD system can configure the SRS transmission successfully and effectively, and the conflict between the SRS and the uplink control information can be avoided. In addition, the solutions of the present invention can further meet all UEs' requirements for different SRS periodicities and positions with flexibility, reduce inter-cell interference, and flexibly support various configurations for transmitting SRS in the UpPTS in the TDD system, and reduce signaling overhead to the greatest extent. Further more, for the FDD system and the TDD system, respective solutions of the present invention are in consistence but have slight differences in details, and thus have consistency in design for the FDD system and the TDD system.

The foregoing is only embodiments of the present invention. The protection scope of the present invention, however, is not limited to the above description. Any change or substitution, easily occurring to those skilled in the art, should be covered by the protection scope of the present invention.

What is claimed is:

1. A method for configuring a Sounding Reference Signal (SRS), comprising:
   determining, by a base station, an SRS periodicity available for a cell, and determining at least one SRS configuration position available for the cell based on the SRS periodicity determined; and
   jointly coding, by the base station, the SRS periodicity and the at least one SRS configuration position, and transmitting a result of the joint coding to all User Equipments (UE) in the cell through broadcast signaling;
   presetting a relation table which associates a configuration number with an SRS periodicity and an SRS configuration position;
   wherein jointly coding by the base station the SRS periodicity and the SRS configuration position and transmitting a result of the joint coding to all UEs in the cell through broadcast signaling comprise:
   searching the relation table for at least one configuration number corresponding to the SRS periodicity and the at least one SRS configuration position determined by the base station, and loading a binary code of the at least one configuration number found into the broadcast signaling to be transmitted to all the UEs in the cell.

2. The method of claim 1, wherein determining by the base station the SRS periodicity available for the cell comprises:
   determining, according to characteristics including a service model of the cell, requirements for SRS required by operations including uplink scheduling, downlink scheduling and downlink beamforming;
   configuring, according to the requirements, the SRS periodicity available for the cell based on a UE requiring the most SRS in the cell with meeting requirements of other UEs for the SRS.

3. The method of claim 1, further comprising any or any combination of: before determining by the base station the SRS periodicity available for the cell,
   configuring a maximum SRS periodicity available in the base station;
   configuring a maximum number of candidate SRS symbol positions within one periodicity in the cell.

4. The method of claim 1, wherein the method is applied to a Time Division Duplex (TDD) system; and
   the determining by the base station at least one SRS transmission position available in the cell within the SRS periodicity determined comprises:
   configuring an SRS in an Uplink Pilot Time Slot (UpPTS) while meeting a requirement of the SRS periodicity.

5. The method of claim 4, wherein the SRS configuration position comprises information on whether an uplink sub-frame includes an SRS without indicating the number of SRS symbols in the UpPTS.

6. The method of claim 1, wherein determining at least one SRS configuration position available for the cell based on the SRS periodicity determined comprises:
   if an SRS periodicity is configured for an adjacent cell is the same with the SRS periodicity of the local cell, selecting, by the base station, from the relation table, a configuration manner corresponding to the SRS periodicity in which an SRS configuration position is different from an SRS configuration position of the local cell; and
   configuring the configuration manner for the adjacent cell.

7. The method of claim 1, further comprising:
   after jointly coding by the base station the SRS periodicity and the at least one SRS configuration position by the base station and transmitting a result of the joint coding to all UEs in the cell through the broadcast signaling,
   determining, by the base station, an SRS periodicity and at least one SRS transmission position for a UE; and transmitting an indication indicating a result of jointly coding the SRS periodicity and the at least one SRS transmission position configured for the UE to the UE through UE-specific signaling.

8. A method for configuring a Sounding Reference Signal (SRS), comprising:
   determining, by a base station, an SRS periodicity and at least one SRS transmission position for a UE, and transmitting an indication indicating a result of jointly coding the SRS periodicity and the at least one SRS transmission position to the UE through UE-specific signaling;

wherein the method is applied to a Time Division Duplex (TDD) system; and wherein determining at least one SRS transmission position for the UE comprises:

determining, by the base station, a configuration manner for transmitting an SRS in an Uplink Pilot Time Slot (UpPTS), wherein the configuration manner comprises one of:

transmitting the SRS only at the first symbol in the UpPTS;

transmitting the SRS only at the second symbol in the UpPTS;

transmitting the SRS simultaneously at two symbols in the UpPTS via one transmitting antenna;

transmitting the SRS simultaneously at two symbols in the UpPTS via different transmitting antennae alternately.

9. The method of claim 8, wherein transmitting by the base station the indication indicating a result of jointly coding the SRS periodicity and the at least one SRS transmission position to the UE through UE-specific signaling comprises:

jointly coding, by the base station, the SRS periodicity and the at least one SRS transmission position, transmitting the result of the joint coding to the UE through the UE-specific signaling, and utilizing an explicit format for indicating the configuration manner for the UE transmitting the SRS in the UpPTS;

or, jointly coding, by the base station, the SRS periodicity, the at least one SRS transmission position for the UE, and the configuration manner for the UE transmitting the SRS in the UpPTS; and transmitting a result of the joint coding to the UE through the UE-specific signaling.

10. An apparatus for configuring a Sounding Reference Signal (SRS), comprising:

a cell-specific SRS periodicity configuring module, adapted to determine an SRS periodicity available for a cell;

a cell-specific SRS position configuring module, adapted to determine at least one SRS position in a sub-frame available for the cell based on the SRS periodicity determined by the cell-specific SRS periodicity configuring module;

a joint coding module, adapted to jointly code the SRS periodicity determined by the cell-specific SRS periodicity configuring module and the at least one SRS position determined by the cell-specific SRS position configuring module; and a broadcast signaling transmitting module, adapted to transmit a result of joint coding obtained by the joint coding module via broadcast signaling;

wherein the joint coding module comprises:

a configuration table unit, adapted to store a relation table which associates a configuration number with an SRS periodicity and an SRS configuration position;

a searching unit, adapted to search in the relation table for at least one configuration number according to the SRS periodicity and the at least one SRS transmission position determined.

11. An apparatus for configuring a Sounding Reference Signal (SRS), comprising:

a User Equipment (UE)-specific SRS periodicity configuring module, adapted to determine a periodicity for SRS transmission of a UE in a cell;

a UE-specific SRS position configuring module, adapted to determine at least one position for SRS transmission of the UE based on the periodicity determined by the UE-specific SRS periodicity configuring module;

a joint coding module, adapted to jointly code the periodicity determined by the UE-specific SRS periodicity configuring module and the at least one position determined by the UE-specific SRS position configuring module;

a UE-specific signaling transmitting module, adapted to transmit a result of the joint coding from the joint coding module to the UE through UE-specific signaling;

wherein the UE-specific SRS position configuring module comprises:

a guarding period configuring unit, adapted to set a configuration manner of SRS transmission in an Uplink Pilot Time Slot (UpPTS).

12. The apparatus of claim 11, wherein the joint coding module is adapted to jointly code the periodicity for SRS transmission of the UE and the position for SRS transmission of the UE, and adopt an explicit format of the UE-specific signaling for indicating the configuration manner of SRS transmission in the UpPTS; or the joint coding module is adapted to jointly code the periodicity for SRS transmission of the UE, the at least one position SRS transmission of the UE and the configuration manner of SRS transmission in the UpPTS.

13. An apparatus for configuring a Sounding Reference Signal (SRS), comprising:

an SRS periodicity configuring module, adapted to determine an SRS periodicity available for a cell and a periodicity of SRS transmission for a UE in the cell;

an SRS position configuring module, adapted to determine at least one SRS configuration position available for the cell based on the SRS periodicity determined by the SRS periodicity configuring module for the cell; and determine at least one position for the UE to transmit SRS based on the periodicity determined by the SRS periodicity configuring module for the UE;

a joint coding module, adapted to jointly code the SRS periodicity determined by the SRS periodicity configuring module for the cell and the at least one SRS configuration position determined by the SRS position configuring module for the cell; and jointly code the periodicity determined by the SRS periodicity configuring module for the UE and the at least one position determined by the SRS position configuring module for the UE to transmit the SRS;

a signaling transmitting module, adapted to transmit a result of jointly coding the SRS periodicity for the cell and the at least one SRS configuration position for the cell from the jointly coding module through broadcast signaling; and transmit a result of jointly coding the periodicity for the UE and the at least one position for the UE from the joint coding module to the UE through UE-specific signaling;

wherein the joint coding module comprises:

a configuration table unit, adapted to store a relation table which associates a configuration number with an SRS periodicity and an SRS configuration position; and a searching unit, adapted to search in the relation table in the configuration table unit for at least one configuration number corresponding to the SRS periodicity and the at least one SRS configuration position determined by the SRS position configuring module; and wherein the signaling transmitting module is adapted to load a binary code of the at least one configuration number found by the searching unit into the broadcast signaling.

* * * * *

UNITED STATES PATENT AND TRADEMARK OFFICE
CERTIFICATE OF CORRECTION

PATENT NO. : 8,391,190 B2
APPLICATION NO. : 12/990372
DATED : March 5, 2013
INVENTOR(S) : Xueming Pan et al.

It is certified that error appears in the above-identified patent and that said Letters Patent is hereby corrected as shown below:

In the Title Page:

Item (73) Assignee: "China Academy of Telecommunications Equipment Co., Ltd." should be -- China Academy of Telecommunications Technology --.

Signed and Sealed this
Thirteenth Day of May, 2014

Michelle K. Lee
*Deputy Director of the United States Patent and Trademark Office*